United States Patent
Ke et al.

(10) Patent No.: US 7,542,384 B2
(45) Date of Patent: Jun. 2, 2009

(54) OBJECTIVE LENS ACTUATOR

(75) Inventors: Chau-Yuan Ke, Hsinchu (TW); Hsiang-Chieh Yu, Hsinchu (TW); Wen-Jen Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 572 days.

(21) Appl. No.: 11/311,539

(22) Filed: Dec. 20, 2005

(65) Prior Publication Data

US 2006/0146661 A1  Jul. 6, 2006

(30) Foreign Application Priority Data

Dec. 31, 2004  (TW) .............. 93141619 A

(51) Int. Cl.
*G11B 7/00* (2006.01)
(52) U.S. Cl. .................................. 369/44.15
(58) Field of Classification Search .............. 369/44.15, 369/44.16, 44.22
See application file for complete search history.

(56) References Cited

U.S. PATENT DOCUMENTS

| | | | | |
|---|---|---|---|---|
| 4,646,283 | A | * | 2/1987 | Ito et al. ................. 369/44.15 |
| 4,991,161 | A | * | 2/1991 | Ikegame et al. .......... 369/44.15 |
| 5,216,648 | A | * | 6/1993 | Noda et al. .............. 369/44.14 |
| 6,714,491 | B1 | * | 3/2004 | Ke et al. .................. 369/44.11 |
| 6,724,696 | B2 | * | 4/2004 | Kim et al. ................ 369/44.16 |
| 7,408,848 | B2 | * | 8/2008 | Ke et al. .................. 369/44.14 |

* cited by examiner

*Primary Examiner*—Thang V Tran
(74) *Attorney, Agent, or Firm*—Birch, Stewart, Kolasch & Birch, LLP

(57) ABSTRACT

An objective lens actuator is provided. An objective lens holder is movably located on a ferromagnetic yoke with corresponding to inner yokes thereof to hold an objective lens. Tracking coils and focusing coils are respectively located on different two opposite sides of the lens holder and the latter are surrounded with the inner yokes. A magnetic element set is located on the ferromagnetic yoke corresponding to the coils to generate a magnetic field perpendicular to the optical axis of the lens. A suspension wire set is connected to the lens holder and the coils to hang the lens holder and channel current to the coils. A damper holder is located on a ferromagnetic yoke to allow the wire set to pass through. A printed circuit board is located on the damper holder and coupled with the wire set to provide the current to the coils, to drive the lens holder.

20 Claims, 5 Drawing Sheets

OBJECTIVE LENS ACTUATOR

CROSS-REFERENCE TO RELATED APPLICATIONS

This non-provisional application claims priority under 35 U.S.C. § 119(a) on Patent Application No(s). 93141619 filed in Taiwan, R.O.C. on Dec. 31, 2004, the entire contents of which are hereby incorporated by reference.

FIELD OF THE INVENTION

The present invention relates to an objective lens actuator for controlling and driving an optical pickup head.

BACKGROUND OF THE INVENTION

The technique of using a laser beam (such as a semiconductor laser) to read data recorded in a read-only optical recording medium (such as a CD or DVD) is known in the art. The laser beam is focused on the track on the surface of the optical disc through an objective lens located in an optical pickup head. A photo detector is used to transform the return light reflected from the optical disc to regenerated signals so that the data recorded in the optical disc may be retrieved. During the data reading process, a tracking signal, focusing signal and radial tilt signal also have to be retrieved from the return light. The tracking signal and the focusing signal are used to control an actuator to move the objective lens in the optical axis direction (i.e. focusing direction), optical disc radial direction (i.e. tracking direction) and radial tilt direction so that the laser beam can accurately focus on a preset track on the optical disc surface.

While control of the radial tilt direction is not necessary in the reading operation of the read-only optical recording media, it is mandatory when the laser beam is used to write data on the writable optical recording media to control writing accuracy. The known technique at present for this purpose is using an actuator that contains a plurality of coils on an objective lens bracket (or other elements), or forming a plurality of coils on a printed circuit board attached to an objective lens bracket to control moving directions of the objective lens.

SUMMARY OF THE INVENTION

In view of the aforesaid problems, the primary object of the present invention is to provide an objective lens actuator to control the focusing direction, tracking direction and tilt direction of the pickup head.

In order to achieve the foregoing object, the objective lens actuator according to the invention includes a ferromagnetic yoke, an objective lens holder, tracking coils, focusing coils, a magnetic element set, a suspension wire set, a damper holder and a printed circuit board. The ferromagnetic yoke includes two inner yokes. The objective lens holder is located on the ferromagnetic yoke and movable relative to the inner yokes to hold an objective lens. The tracking coils are located on two opposite sides of the objective lens holder. The focusing coils are located on the other two opposite sides of the objective lens holder, and are surrounded with the two inner yokes. The magnetic element set is located on the ferromagnetic yoke corresponding to the tracking coils and the focusing coils to generate a magnetic field perpendicular to the optical axis of the objective lens. The suspension wire set is connected to the objective lens holder, tracking coils and focusing coils to hang the objective lens holder and channel current to the tracking coils and focusing coils. The damper holder is located on the ferromagnetic yoke to allow the suspension wire set to pass through. The printed circuit board is located on the damper holder and coupled with the suspension wire set to provide current to the tracking coils and focusing coils to drive the objective lens holder.

The current is transferred through the printed circuit board, suspension wires, and another suspension wires to the tracking coils and the focusing coils to generate a strong magnetic field in air gaps formed between the inner yokes and the side flanges so that the tracking coils and the focusing coils can generate Lorentz forces. When the current passes through the focusing coils, a Lorentz force is generated to move the objective lens holder perpendicularly. When the Lorentz forces generated by the two focusing coils are different, the Lorentz force difference drives the objective lens holder to move in an inclined manner so that incident light on the data storage medium is maintained perpendicular to the data storage medium and improved signals may be obtained.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
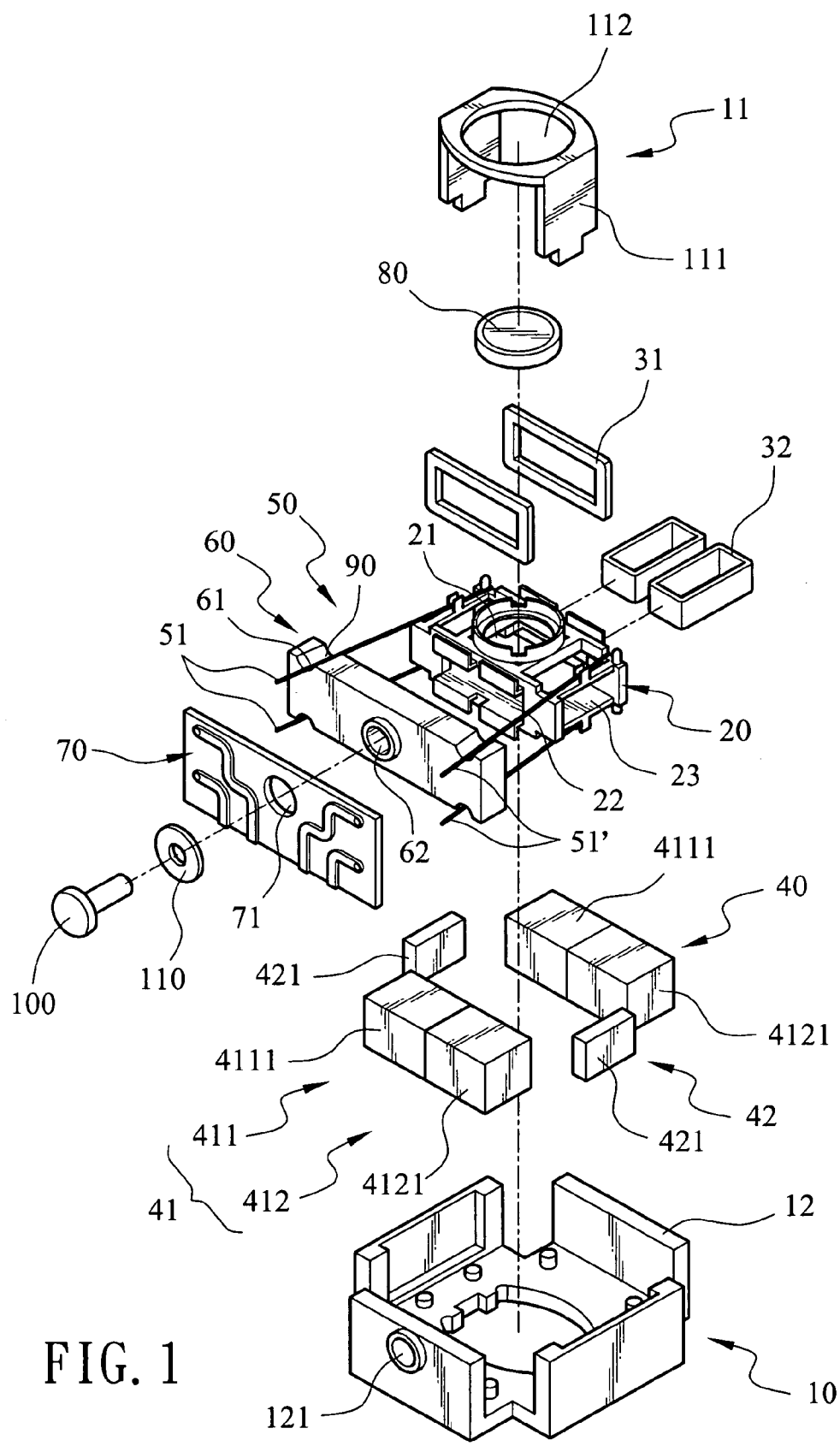
FIG. 1 is an exploded view of the invention.
Figure 2:
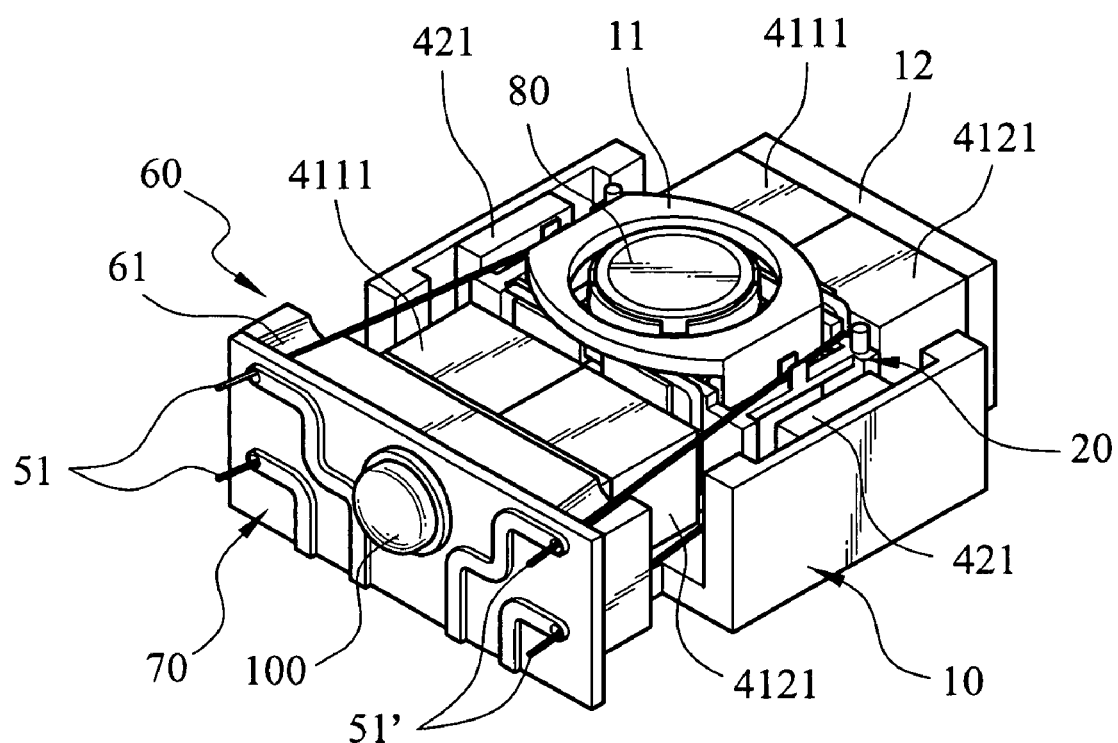
FIG. 2 is a perspective view of the invention.
Figure 3:
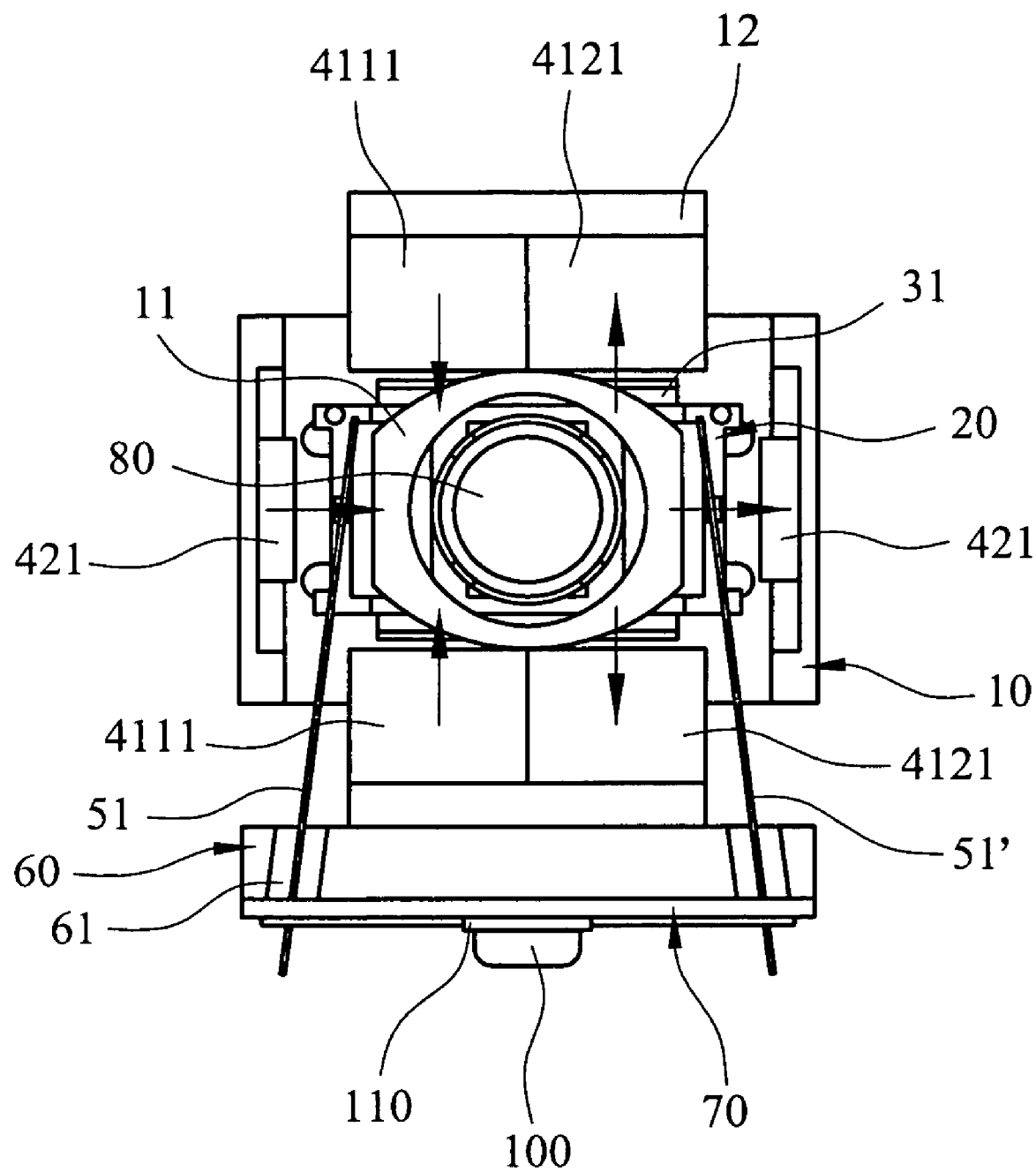
FIG. 3 is a schematic view of magnetic directions of the magnetic flux element set of the invention.

Referring to FIGS. 1, 2 and 3, the objective lens actuator according to the invention includes a ferromagnetic yoke 10, an objective lens holder 20, tracking coils 31, focusing coils 32, a magnetic element set 40, a suspension wire set 50, a damper holder 60 and a printed circuit board 70.

Figure 4A:
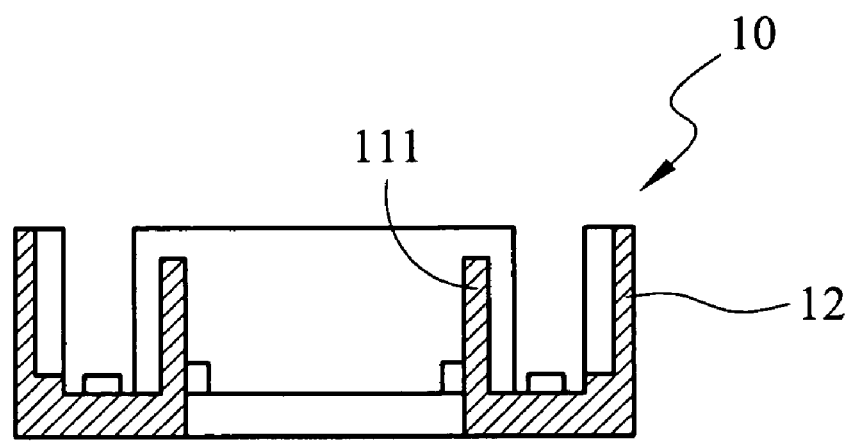
FIGS. 4A and 4B are schematic views of the relationship between the ferromagnetic yoke and the inner yokes.
Figure 4B:
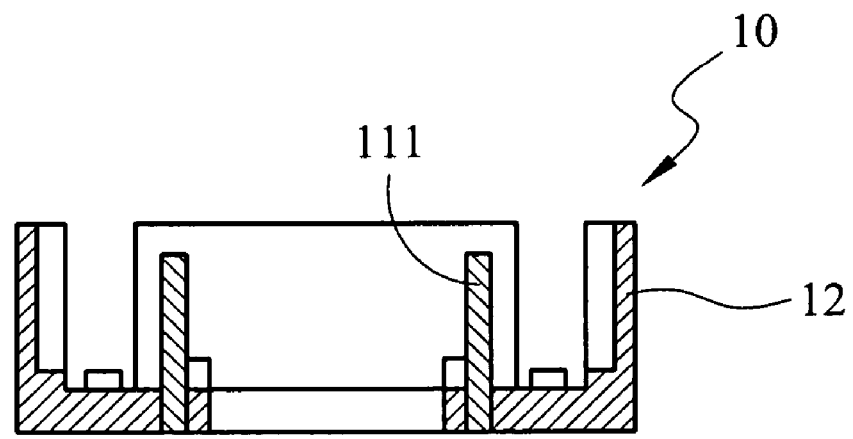

The ferromagnetic yoke 10 includes a cap 11 and a plurality of side flanges 12 located on lateral sides. The cap 11 includes two inner yokes 111 and an opening 112. The inner yokes 111 are surrounded on the objective lens holder 20. The side flanges 12 aim to hold the magnetic element set 40, damper holder 60 and printed circuit board 70. One of the side flanges 12 has a screw hole 121. The ferromagnetic yoke 10 and the inner yokes 111 may be integrally formed, or be coupled by riveting. Refer to FIGS. 4A and 4B for the relationship of the ferromagnetic yoke and the inner yokes.

The objective lens holder 20 is movably located on the ferromagnetic yoke 10 corresponding to the inner yokes 111, and has an objective lens holding port 21, two tracking coil insertion openings 22 and two focusing coil insertion openings 23. The objective lens holding port 21 corresponds to the opening 112 to hold an objective lens 80. The tracking coil insertion openings 22 are located on two opposite sides of the objective lens holder 20. The focusing coil insertion openings 23 are located on the other two opposite sides of the objective lens holder 20 to receive the focusing coils 32.

The tracking coils 31 are located on the two opposite sides of the objective lens holder 20 through the tracking coil openings 22. The area surrounded by the tracking coils 31 has a normal direction parallel with the track direction (not shown in the drawings) of a data storage medium which is over the top of the objective lens 80 corresponds. The focusing coils 32 are located on the other two opposite sides of the objective lens holder 20 through the focusing coil openings 23, and are surrounded with the inner yokes 111. The area surrounded by the focusing coils 32 has a positive direction parallel with the optical axis of the objective lens 80.

The magnetic element set 40 is located on the ferromagnetic yoke 10 corresponding to the tracking coils 31 and the focusing coils 32 to generate a magnetic field perpendicular to the optical axis of the objective lens 80. It includes a first magnetic element unit 41 and a second magnetic element unit 42.

The first magnetic element unit 41 corresponds to the tracking coils 31 and has magnetic flux direction perpendicular to the light passing through the objective lens 80 to reach the tracks of the data storage medium (not shown in the drawings). It includes a first portion 411 and a second portion 412. The first portion 411 has two opposing first magnetic elements 4111. The second portion 412 has two opposing second magnetic elements 4121. The magnetic flux direction from the N pole to the S pole of the first magnetic elements 4111 coincides with the direction from the side flanges 12 of the ferromagnetic yoke 10 to the objective lens holder 20. The magnetic flux direction from the N pole to the S pole of the second magnetic elements 4121 coincides with the direction from the objective lens holder 20 to the side flanges 12 of the ferromagnetic yoke 10.

The second magnetic element unit 42 corresponds to the focusing coils 32, and has magnetic flux direction perpendicular to the first magnetic element unit 41. The second magnetic element unit 42 includes two third magnetic elements 421. The magnetic flux direction of the third magnetic elements 421 from the N pole to the S pole coincides with the direction from the side flanges 12 of the ferromagnetic yoke 10 to the objective lens holder 20, and from the objective lens holder 20 to the side flanges 12 of the ferromagnetic yoke 10. That is when the first magnetic elements 4111 have a magnetic flux direction from the side flanges 12 of the ferromagnetic yoke 10 to the objective lens holder 20, and the third magnetic elements 421 is next to the first magnetic elements 4111, then the third magnetic elements 421 also have a magnetic fluxdirection from the side flanges 12 of the ferromagnetic yoke 10 to the objective lens holder 20. Moreover, when the second magnetic elements 4121 have a magnetic fluxdirection from the objective lens holder 20 to the side flanges 12 of the ferromagnetic yoke 10, and the third magnetic elements 421 is next to the first magnetic elements 4111, then the third magnetic elements 421 also have a magnetic flux direction from the objective lens holder 20 to the side flanges 12 of the ferromagnetic yoke 10.

The positioned manner of the inner yokes 111 makes the magnetic flux generated by the first magnetic elements 4111, the second magnetic elements 4121 and the third magnetic elements 421, which between the inner yokes 111 and the side flanges 12, are the same or almost the same. Namely, the air gap has a magnetic field to enable the tracking coils 31 and the focusing coils 32 to generate Lorentz forces.

The suspension wire set 50 includes suspension wires 51 and another suspension wires 51' that have one end connecting to the objective lens holder 20, tracking coils 31 and focusing coils 32 to hang the objective lens holder 20, and channel current to the tracking coils 31 and focusing coils 32.

The damper holder 60 is located on a ferromagnetic yoke 10 and has a notch 61 to hold a damper 90 in which the suspension wire set 50 passes through. The damper holder 60 has a screw hole 62.

Figure 5:
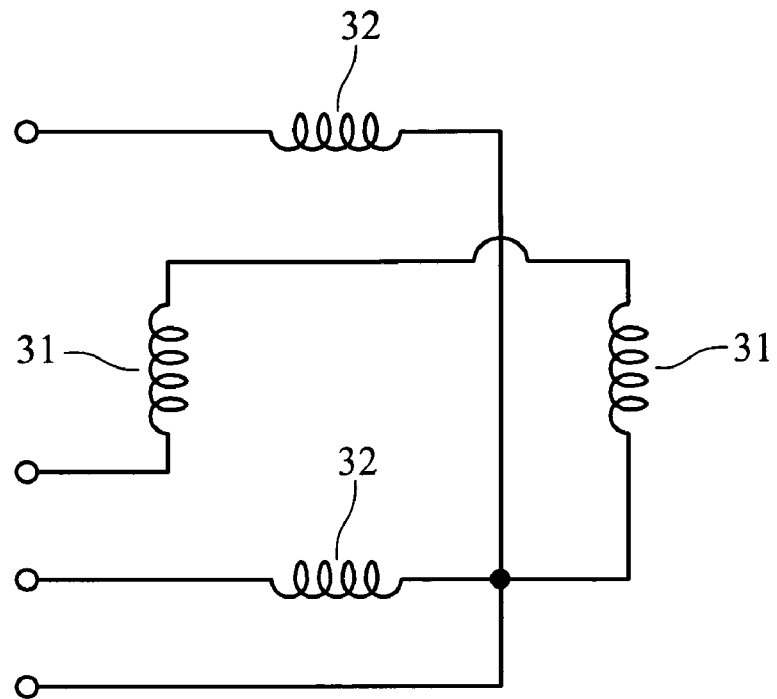
FIG. 5 is a schematic view of the coupling relationship of the suspension wires, tracking coils and focusing coils.

The printed circuit board 70 is located on the damper holder 60 and surrounded with the suspension wire set 50 on the other end of the suspension wire 51 to provide current to the tracking coils 31 and the focusing coils 32 to drive the objective lens holder 20. The printed circuit board 70 also has a screw hole 71. The printed circuit board 70 has four electric contacts (namely the locations where the suspension wire set 50 is connected to the printed circuit board 70). One of the electric contacts is grounded. The suspension wire set 50 has four conductive wires 51 corresponding to the four electric contacts, and connecting to four corners of the objective lens holder 20 in a symmetrical manner on the left side and the right side. The two focusing coils 32 are coupled in series, and connected to one of the suspension wires 51 and the another suspension wire 51', which is connected to the grounded electric contact. The two tracking coils 31 are connected respectively to the other suspension wire 51 and the other of the another suspension wires 51', which is connected to the grounded electric contact. Refer to FIG. 5 for the coupling relationship of the suspension wires, tracking coils and focusing coils.

For assembly of the invention, place the two first magnetic elements 4111 of the first portion 411 and the second magnetic elements 4121 of the second portion 412 of the magnetic element set 40 onto two opposing side flanges 12, and place the third magnetic elements 421 on the other two opposing side flanges 12. Place the objective lens 80 on the objective lens holding port 21. Couple the inner yokes 111 with the objective lens holder 20 with the opening 112 corresponding to the objective lens 80. Then place the tracking coils 31 on two opposite sides of the objective lens holder 20 through the tracking coil insertion openings 22, and place the focusing coils 32 on the other two opposite sides of the objective lens holder 20 through the focusing coil insertion openings 23, and also couple with the inner yokes 111. Fasten one end of the suspension wires 51 and the another suspension wires 51' to the objective lens holder 20, tracking coils 31 and focusing coils 32. Have the other ends of the suspension wires 51 and the another suspension wires 51' passing through the damper 90 to connect to the electric contacts of the printed circuit board 70. Then fasten screws 100 through a washer 110, the screw hole 121 on the side flange 12, the screw hole 62 on the damper holder 60 and the screw hole 71 on the printed circuit board 70 to couple the side flanges 12, damper holder 60 and printer circuit board 70 together.

After assembled as previously discussed, current can flow through the printed circuit board 70 and the suspension wires 51 and the another suspension wires 51', and then flow to the tracking coils 31 and focusing coils 32, so that the air gaps between the inner yokes 111 and the side flanges 12 have a magnetic field, to enable the tracking coils 31 and focusing coils 32 to generate Lorentz forces. While the current flows through the focusing coils 32, Lorentz forces are generated to move the objective lens holder 20 perpendicularly. If the Lorentz forces generated by the two focusing coils 32 are different, the variation of the Lorentz forces drives the objective lens holder 20 in a tilted movement so that the incident light projected onto the data storage medium may be kept as perpendicular as possible, to get a desired signal. Referring to FIG. 3, through the design of the focusing coils 32, the first magnetic element unit 41 and second magnetic element unit 42, the utilization efficiency (sensitivity) of the focusing coils 32 can be improved up to 75% compared with the conventional techniques. The general method to calculate the sensitivity of the coil is as follows:

(Magnetic flux density×Effective length of the coil)/(Mass of the moving part×Total length of the coil×Coil resistance)

The moving part means the subassembly which is suspended by the suspension wires. The moving part may include lens holder, lens, solder points, and etc.

Figure 6:
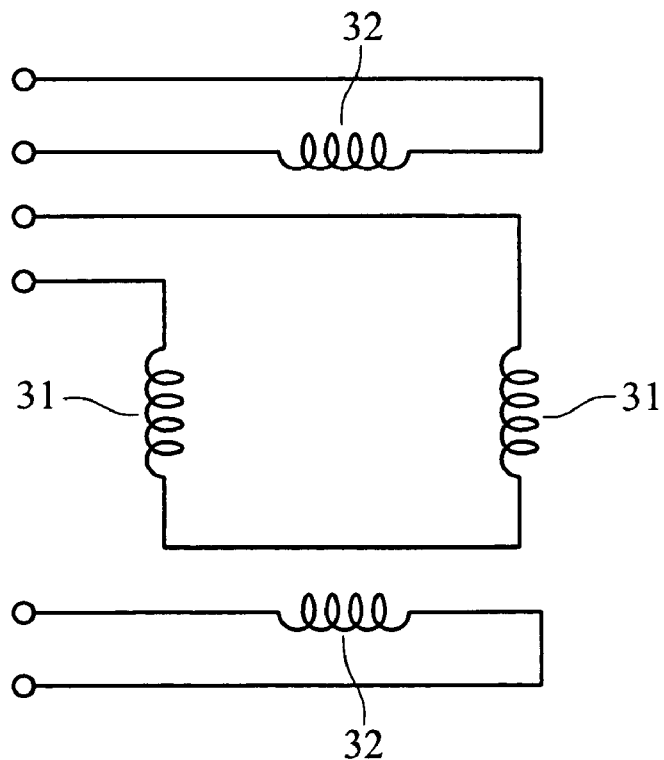
FIG. 6 is another schematic view of the coupling relationship of the suspension wires, tracking coils and focusing coils.

Refer to FIG. 6 for another embodiment of the coupling relationship of the suspension wires, tracking coils and focusing coils according to the invention. Refer to FIG. 3 for the design of the magnetic path. In this embodiment, the printer circuit board 70 has six electric contacts two focusing coils The suspension wire set 50 has six suspension wires corresponding to the six electric contacts. The two focusing coils 32 which are placed in the two sides of the objective lens holder 20 respectively are independent. Each of the focusing coils 32 has two focusing wire contacts which connect to a suspension wire. The tracking coils 31 are series connection and each has two tracking wire contacts which connect to a suspension wire.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An objective lens actuator, comprising:
a ferromagnetic yoke including two inner yokes;
an objective lens holder movably located on the ferromagnetic yoke corresponding to the inner yokes for holding an objective lens;
two tracking coils and two focusing coils which are respectively located on two opposite sides of the objective lens holder and located on the other two opposite sides of the objective lens holder and surrounded with the two inner yokes;
a magnetic element set located on the ferromagnetic yoke corresponding to the tracking coils and the focusing coils to generate a magnetic field perpendicular to the optical axis of the objective lens;
a suspension wire set connecting to the objective lens holder, the tracking coils, and the focusing coils to hang the objective lens holder and channel current to the tracking coils and the focusing coils;
a damper holder located on the ferromagnetic yoke to allow the suspension wire set to pass through; and
a printed circuit board located on the damper holder and surrounded with the suspension wire set to provide the current to the tracking coils and the focusing coils to drive the objective lens holder,
wherein the magnetic element set includes a first magnetic element unit and a second magnetic element unit, the first magnetic element unit having a magnetic flux parallel with a normal direction of the an area which the tracking coils surround, the second magnetic element unit corresponding to the focusing coils and having a magnetic flux perpendicular to the first magnetic element unit, and
wherein the first magnetic element unit includes a first portion and a second portion, the first portion having two opposing first magnetic elements, the second portion having two opposing second magnetic elements, the magnetic flux direction of the first magnetic elements from the N pole to the S pole being coincided with the direction from the ferromagnetic yoke to the objective lens holder, the magnetic flux direction of the second magnetic elements from the N pole to the S pole being coincided with the direction from the objective lens holder to the ferromagnetic yoke, the second magnetic element unit including two third magnetic elements that have a magnetic flux direction from the N pole to the S pole coinciding with the direction from the ferromagnetic yoke to the objective lens holder, and from the objective lens holder to the ferromagnetic yoke to make the magnetic flux direction of each of the third magnetic element and the magnetic flux direction of the second magnetic element the same as the direction from the ferromagnetic yoke to the objective lens holder, or the direction from the objective lens holder to the ferromagnetic yoke.

2. The objective lens actuator of claim 1, wherein the ferromagnetic yoke has a plurality of side flanges on lateral sides to hold the magnetic element set, the damper holder and the printed circuit board.

3. The objective lens actuator of claim 2, wherein the side flange, the damper holder and the printed circuit board have respectively a screw hole to receive a screw to fasten the damper holder and the printed circuit board to the side flange.

4. The objective lens actuator of claim 2, wherein the side flanges, the inner yokes and the magnetic element set have air gaps formed therebetween that have magnetic fields to allow the tracking coils and the focusing coils to generate Lorentz-forces.

5. The objective lens actuator of claim 1, wherein the objective lens holder has an objective lens holding port to hold the objective lens.

6. The objective lens actuator of claim 5, wherein the ferromagnetic yoke has a cap which includes the two inner yokes and an opening to couple with the objective lens holder and correspond to the objective lens holding port.

7. The objective lens actuator of claim 1, wherein the ferromagnetic yoke and the inner yokes are integrally formed.

8. The objective lens actuator of claim 1, wherein the ferromagnetic yoke and the inner yokes are coupled by riveting.

9. The objective lens actuator of claim 1, wherein the objective lens holder has two tracking coil insertion openings and two focusing coil insertion openings to receive the tracking coils and the focusing coils.

10. The objective lens actuator of claim 1, wherein the tracking coils surround an area which has a normal direction parallel with the track direction of the track over the objective Lens, and the focusing coils surround an area which has a positive direction parallel with the optical axis of the objective lens.

11. The objective lens actuator of claim 1, wherein the damper holder has a notch to allow the suspension wire set to pass through a damper.

12. An objective lens actuator, comprising:
a ferromagnetic yoke including two inner yokes;
an objective lens holder movably located on the ferromagnetic yoke corresponding to the inner yokes for holding an objective lens;
two tracking coils and two focusing coils which are respectively located on two opposite sides of the objective lens holder and located on the other two opposite sides of the objective lens holder and surrounded with the two inner yokes;
a magnetic element set located on the ferromagnetic yoke corresponding to the tracking coils and the focusing coils to generate a magnetic field perpendicular to the optical axis of the objective lens;

a suspension wire set connecting to the objective lens holder, the tracking coils, and the focusing coils to hang the objective lens holder and channel current to the tracking coils and the focusing coils;

a damper holder located on the ferromagnetic yoke to allow the suspension wire set to pass through; and a printed circuit board located on the damper holder and surrounded with the suspension wire set to provide the current to the tracking coils and the focusing coils to drive the objective lens holder, wherein the magnetic element set includes a first magnetic element unit and a second magnetic element unit, the first magnetic element unit having a magnetic flux parallel with a normal direction of the an area which the tracking coils surround, the second magnetic element unit corresponding to the focusing coils and having a magnetic flux perpendicular to the first magnetic element unit, and wherein the first magnetic element unit includes a first portion and a second portion, the first portion having two opposing first magnetic elements, the second portion having two opposing second magnetic elements, the magnetic flux direction of the first magnetic elements from the N pole to the S pole being coincided with the direction from the ferromagnetic yoke to the objective lens holder, the direction of the second magnetic elements from the N pole to the S pole being coincided with the direction from the ferromagnetic yoke to the objective lens holder, the second magnetic element unit including two third magnetic elements that have a magnetic flux direction from The ferromagnetic yoke to the objective lens holder.

13. The objective lens actuator of claim 12, wherein the ferromagnetic yoke has a plurality of side flanges on lateral sides to hold the magnetic element set, the damper holder and the printed circuit board.

14. The objective lens actuator of claim 13, wherein the side flanges, the inner yokes and the magnetic element set have air gaps formed therebetween that have magnetic fields to allow the tracking coils and the focusing coils to generate Lorentzforces.

15. An objective lens actuator, comprising:
a ferromagnetic yoke including two inner yokes;
an objective lens holder movably located on the ferromagnetic yoke corresponding to the inner yokes for holding an objective lens;
two tracking coils and two focusing coils which are respectively located on two opposite sides of the objective lens holder and located on the other two opposite sides of the objective lens holder and surrounded with the two inner yokes;
a magnetic element set located on the ferromagnetic yoke corresponding to the tracking coils and the focusing coils to generate a magnetic field perpendicular to the optical axis of the objective lens;
a suspension wire set connecting to the objective lens holder, the tracking coils, and the focusing coils to hang the objective lens holder and channel current to the tracking coils and the focusing coils;
a damper holder located on the ferromagnetic yoke to allow the suspension wire set to pass through; and
a printed circuit board located on the damper holder and surrounded with the suspension wire set to provide the current to the tracking coils and the focusing coils to drive the objective lens holder,
wherein the printed circuit board has four electric contact points, the suspension wire set includes a first suspension wire, a second suspension wire, a third suspension wire, and a fourth suspension, each wire connects to one electric contact of the printed circuit board by one end, respectively, the other end of each wire connects to one end of the coils on the lens holder, the two ends of the two serially connected tracking coils axe connected to the first and the second suspension wire respectively, the two ends of the first focusing coil are connected to the first and the third suspension wires respectively, and the two ends of the second focusing coil are connected to the first and the fourth suspension wires respectively.

16. The objective lens actuator of claim 15, wherein the ferromagnetic yoke has a plurality of side flanges on lateral sides to hold the magnetic element set, the damper holder and the printed circuit board.

17. The objective lens actuator of claim 16, wherein the side flanges, the inner yokes and the magnetic element set have air gaps formed therebetween that have magnetic fields to allow the tracking coils and the focusing coils to generate Lorentzforces.

18. An objective lens actuator, comprising:
a ferromagnetic yoke including two inner yokes;
an objective lens holder movably located on the ferromagnetic yoke corresponding to the inner yokes for holding an objective lens;
two tracking coils and two focusing coils which are respectively located on two opposite sides of the objective lens holder and located on the other two opposite sides of the objective lens holder and surrounded with the two inner yokes;
a magnetic element set located on the ferromagnetic yoke corresponding to the tracking coils and the focusing coils to generate a magnetic field perpendicular to the optical axis of the objective lens;
a suspension wire set connecting to the objective lens holder, the tracking coils, and the focusing coils to hang the objective lens holder and channel current to the tacking coils and the focusing coils;
a damper holder located on the ferromagnetic yoke to allow the suspension wire set to pass through; and
a printed circuit board located on the damper holder and surrounded with the suspension wire set to provide the current to the tracking coils and the focusing coils to drive the objective lens holder,
wherein the printed circuit board has six electric contacts, the suspension wire set having six suspension wires corresponding to the six electric contacts, the two focusing coils placed in the two sides of the objective lens holder respectively and independent each other, each of the focusing coils has two focusing wire contacts connecting to one of the suspension wire, and the tracking coils are series connection and each of the tracking coils has two tracking wire contacts connecting to another the suspension wire.

19. The objective lens actuator of claim 18, wherein the ferromagnetic yoke has a plurality of side flanges on lateral sides to hold the magnetic element set, the damper holder and the printed circuit board.

20. The objective lens actuator of claim 19, wherein the side flanges, the inner yokes and the magnetic element set have air gaps formed therebetween that have magnetic fields to allow the tracking coils and the focusing coils to generate Lorentzforces.

* * * * *

UNITED STATES PATENT AND TRADEMARK OFFICE
CERTIFICATE OF CORRECTION

| | |
|---|---|
| PATENT NO. | : 7,542,384 B2 |
| APPLICATION NO. | : 11/311539 |
| DATED | : June 2, 2009 |
| INVENTOR(S) | : Chau-Yuan Ke et al. |

It is certified that error appears in the above-identified patent and that said Letters Patent is hereby corrected as shown below:

Column 3, line 6, delete the word "corresponds"; lines 47 and 49-50, replace "fluxdirection" by -- flux direction --; line 52, replace "is" by -- are --.

Column 5, line 12, replace "printer" by -- printed --; line 13, replace "has six electric contacts two focusing coils" by -- has six electric contacts. --; lines 20-21, replace "and each has two tracking wire contacts which connect to a suspension wire" by -- and connect to the other two electric contacts corresponding to the other two suspension wires --; lines 56 and 60, Insert the word -- direction -- after "flux"; line 57, replace "of the an area" by -- of an area --.

Column 6, line 12, replace "element" by -- elements --; lines 21-22, replace "the side flange" by -- one of the side flanges --; line 28, remove the "-" after "Lorentz"; line 49, replace "Lens" by -- lens --.

Column 7, lines 15 and 19, Insert the word -- direction -- after "flux"; line 16, replace "direction of the an area" by -- direction of an area --; line 28, Insert the words -- magnetic flux -- before the word "direction"; line 33, replace "The ferromagnetic yoke" by -- the ferromagnetic yoke --; line 43, replace "Lorentzforces" by -- Lorentz forces --.

Column 8, line 8, replace "axe" by -- are --; line 10, replace "the first focusing coil" by -- one of the focusing coils --; line 12, replace "the second focusing coil" by "the other one of the focusing coils"; line 22, replace "Lorentzforces" by Lorentz forces --; lines 39-40, replace "tack-ing coils" by -- tracking coils --; line 51, Insert the word "of" between the words "independent" and "each"; line 53, replace "suspension wire" by -- suspension wires --; lines 54-56, replace "and each of the tracking coils has two tracking wire contacts connecting to another the suspension wire" by -- and connect to the other two electric contacts corresponding to the other two suspension wires --; line 65, replace "Lorentzforces" by -- Lorentz forces --.

Signed and Sealed this
Fifteenth Day of February, 2011

David J. Kappos
*Director of the United States Patent and Trademark Office*